March 29, 1927.

B. STOLTZ ET AL 1,622,685

APPARATUS FOR MAKING PACKING CUPS

Filed April 22, 1926

INVENTORS
BENJAMIN STOLTZ
DAVID A. LILLIE
By Thomas L. Ryan
ATTORNEY

Patented Mar. 29, 1927.

1,622,685

UNITED STATES PATENT OFFICE.

BENJAMAN STOLTZ AND DAVID A. LILLIE, OF MONTPELIER, INDIANA.

APPARATUS FOR MAKING PACKING CUPS.

Application filed April 22, 1926. Serial No. 103,814.

This invention relates to apparatus or tools for the making of packing rings or cups for well pumps.

For the pistons of the working barrels of pumps for the deeper wells, a packing cup of the type herein referred to, has come into general use. A packing ring of this type, and which may be designated as a packing cup, is made from leather, or from composition fabric. It is cylindrical in cross section and has an internal annular lip at its lower edge, said lip being adapted to be engaged by the clamping devices of the piston head (not shown) and whereby the said cup is held rigidly in its position of accurate central alignment. Requisites of such a cup are toughness and strength, and a suitable degree of ductility and resiliency, and a precisely symmetrical form. A cup of this kind is subjected to very severe wear and strain, and unless it is of rugged structure, and is precisely true in formation, it becomes misaligned within a short period of time, the result being that it quickly becomes subjected to abnormal strains, and is broken down and impaired.

In the art of manufacturing cups of this kind, it is necessary to heat treat or "cure" each of the cups, after it will have been formed, and before the edges of the cup are dressed off or machined. If, in the said curing process, the precisely true symmetry and correct form of the cup will have been lost or impaired, even in the slightest degree, the usefulness of the cup is at once destroyed, and the cup is unfit to be finished.

The objects of the present invention are to provide an apparatus whereby cups of this character may be precisely formed and effectively held in true and precise shape and contour, until the curing will have been completed; and whereby the cups are capable of easily being released at the proper time, from their gripped or clamped status, to the final process of machine finishing of their bores and edges.

The material provided for a cup intended for the piston of pumps for the deeper wells, comprising oil wells and water wells, is in the form of a body disk. This body disk consists of a multiple number of layers or plys of rubber and fabric composition, and which said layers of composition, in the process of forming the cup and in the curing thereof, become merged or congealed into a homogeneous unit.

Our improved apparatus or tool device, is shown in the accompanying drawings, and is described in the following specification. The invention consists of the several parts and combination thereof, and the mode of their operation, as hereinafter set forth and defined in the claims. The several parts of our invention are identified by suitable characters of reference applied thereto, in the different views in the drawings, in which—

Figure 1:
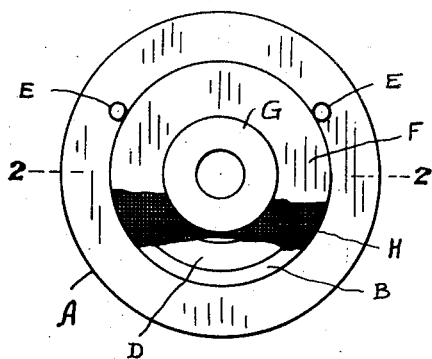
Figure 1 is a top plan view of our invention.
Figure 5:
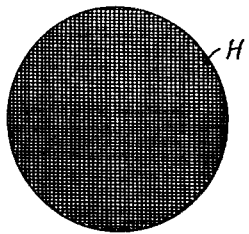
Figure 5 is a plan view of the disk body of composition.

The apparatus shown in the drawings, is intended for the making of a cup of one and one sixteenth inches outside diameter, and comprises the parts as follows: A chuck block, a machined sleeve that rests in the bore of the chuck block, a guide ring or annulus that rests at aligned position concentric with and above the said sleeve, and a pressure head that is adapted to be operated downwardly through the said guide ring.

The chuck block A, which may be of cast grey iron, is about two and five eighths inches in diameter, and of the height in proportion, as shown. It is provided with a central bore A′ of the suitable depth shown, and the annular flat seat B surrounds the top of said bore. Opening from the bottom of the said bore is a vent C. Adapted to rest removably in said bore is a cylindrical machined metal sleeve D which is of height coincident with or about the height of the level of the annular seat B. Rising from the top of the chuck block, at locations equidistant from the center of the bore, and coincident with the external margin of the annular seat B, are studs E and E. A machined metal guide ring or annulus F is of outside diameter to rest removably in the annular seat B, and its internal diameter or bore is such as to permit the passing therethrough of a pressure head G. The function of this pressure head, as will be hereinafter referred to, is to press or force downwardly, within the sleeve D, the material of which the cup is constituted. This pressure head is about one inch in height, is of machined tool steel and may be of the hollow form shown.

The chuck block is adapted to occupy a fixed position at any suitable location where mechanical pressure means may be available for the depressing of the pressure head. To practice our invention, each bench operative is provided with a quantity of the aforenamed associated parts or elements, or in other words, there is available to each operative, the apparatus just described, at the bench, where there is also supplied of the disk bodies H.

Figure 2:
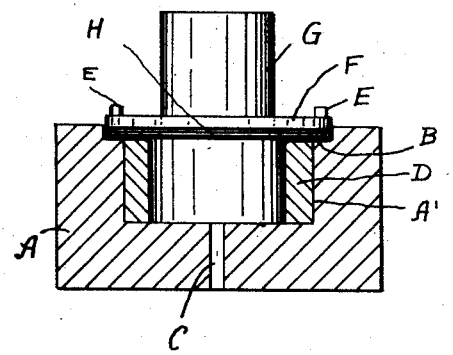
Figure 2 is a central vertical sectional view taken on line 2—2 in Figure 1; the pressure head being shown at raised position and the body disk being in place.
Figure 4:
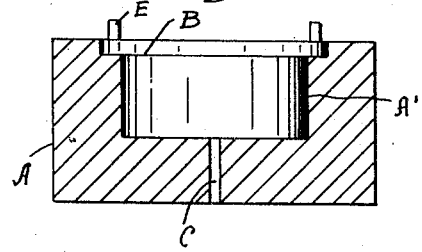
Figure 4 is a vertical sectional view of the chuck block.

This disk body H which consists of a plurality of layers or thicknesses of rubber and textile fabric, is of diameter substantially the same as that of the annular seat B. In the present instance the disk body consists of four layers. The operative disposes the disk body at the position shown in Figure 2, the studs E and E serving to facilitate the placement of the disk body accurately, and at rest on the top surface of the sleeve D and on the annular seat B. The guide ring F is then laid on top of the disk body, the same also being guided to correct location by the studs E and E. The pressure head G is then disposed in the bore of the guide ring and upon the top surface of the disk body, as shown in Figure 2.

Figure 3:
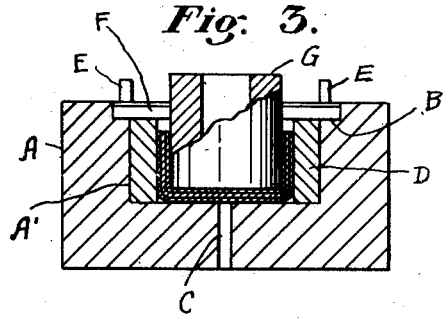
Figure 3 is a view similar to Figure 2, the pressure head having been lowered, and the body disk having been pressed into cup shaped form.

The apparatus is now in readiness to receive the application of pressure to the top of the pressure head G. It has been ascertained by tests and experimentation that the pressure head in its downward movement, must be not fixed or secured to any positively centered plunger means. Any mechanical means whereby the pressure head G may be lowered, is suitable, so long as there are no connections of axial rigidity. The preferred means consists of a vertical reciprocative plunger head (not shown) having a smooth flat bottom surface which engages the smooth flat top surface of the pressure head. The effect of the power thus applied to the pressure head is, that the pressure head in its downward movement conforms with just sufficient yieldability peculiarly necessary in the depressing of the disk body, that the latter is caused to conform uniformly, and without the slightest flexure or abrading, with the seat of the bore A' and the internal face of the sleeve D. The pressure head in its lowered position will have compressed the disk body into the cup shaped form, where it is tenaciously held in the gripped status, as shown in Figure 3.

The operative then lifts the pressure head, cup, and the sleeve from the bore A' (the guide ring having been removed) and the assembly (pressure head, cup, and sleeve) together with quantities of similar assemblies coming from other operatives, are transported to the place of curing. The method of curing, as practiced by us consists of providing a sealed tank or vessel in which a pressure of steam of seventy five pounds per square inch may be maintained. These assemblies, arranged on suitably formed trays, are deposited in said tank in quantities of one thousand to fourteen hundred at a time, which, after being subjected to said heat for about one hour, are removed to the open air. The cup will have then become "cured" that is to say, the layers of composition, will have become so congealed, that the cup is a homogeneous unit. While still retained between the pressure head and the sleeve, the top of the cup is dressed off giving it the finished top H', and the central portion is turned out, giving the finished bore H². The pressure head is then removed, and the cup is removed from the sleeve, in finished form and ready for the market.

A cup constituted and formed in accordance with our invention is of accurate form and contour and is uniform in texture. It is capable of being secured at correct position on the piston head, and being of the uniformly even texture and composition, and of precisely true form, it will work free and with uniformly distributed contact with the bore of the working barrel, there being no tendency to drag, draw, or warp. True alignment, during the working hours, being assured, the life of the cup is prolonged indefinitely, and a long period of usefulness is assured.

Figure 8:
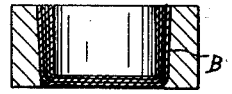
Figure 8 is a sectional view of tapered sleeve and cup.
Figure 6:
Figure 6 is a vertical central sectional view of the cup after it has been removed from its clamped position as shown in Figure 3, and finished.
Figure 7:
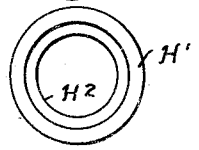
Figure 7 is a plan view of Figure 6.
Figure 9:
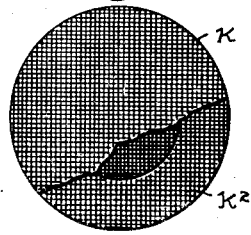
Figure 9 is a plan view of disk body used for tapered form of cup.

The cup H is the standard cylindrical type cup. When it is desired to utilize our invention in the manufacture of a cup in which the external wall is to be slightly tapered, a sleeve having a slightly tapered bore B', as shown in the modification at Figure 8, is used. The disk body K for a tapered form of cup has the layer next to the top, consisting of a ring K². By this arrangement there is sufficient yield of the composition at the point of turning at the bottom edge of the pressure head when the latter reaches the bottom of its stroke, to permit of the proper formation of the wall of the cup without undue flexure or straining of the composition.

We are aware that minor changes may be made in the structure, and conformation of the several elements and parts constituting this invention, within the range of the invention as defined by the appended claims, without departing from the spirit of the invention or sacrificing any of its advantages.

What we claim as our invention, and desire to secure by Letters Patent, is:

1. An apparatus of the kind described, comprising a chuck block having a circular well shaped bore, a machined circular sleeve to rest free in said bore, a guide member having central bore concentric with and of diameter less than the inner diameter of the sleeve, said guide member being adapted to rest at removable position centrally above the said sleeve, and a pressure head adapted to be passed through the said guide member and lowered into said well.

2. An apparatus of the kind described, comprising a chuck block having a circular well shaped bore, studs on the top of said chuck block and at distances spaced from the center thereof, a machined circular sleeve to rest free in said bore, a guide member having a central bore concentric with and of diameter less than the inner diameter of the sleeve and retained at removable position centrally above the said sleeve and having engagement with the said studs, and a pressure head adapted to be passed through the bore of said guide member.

3. An apparatus of the kind described, comprising a chuck block having a well shaped bore, there being an annular seat surrounding the top of said bore, studs located in alignment with the outer edge of said seat, a circular cylindrical sleeve to rest free in said bore, a guide ring adapted to be disposed at position against the said studs, its bore being concentric with and of a diameter less than the inner diameter of the sleeve, and a removable pressure head adapted to be passed through the bore of said guide ring.

4. An apparatus for making packing cups, comprising a machined cylindrical sleeve adapted to be removably seated in a bolster or chuck block, a guideway element disposed above the said sleeve adapted to be retained at position concentric with the bore of said sleeve, and a pressure head member adapted to be lowered through said guideway element.

5. An apparatus of the kind described, comprising a chuck block provided with a well shaped central bore, a cylindrical sleeve removably seated in said bore, a pressure head of diameter smaller than the inner diameter of said sleeve, means to facilitate the placement of a composition disk head on top of the said sleeve and in position concentric therewith, and a guideway element associated with the chuck block to retain the pressure head at central alignment during its lowering movement.

In testimony whereof we affix our signatures.

BENJAMAN STOLTZ.
DAVID A. LILLIE.